July 4, 1961
E. A. CAMBRON
2,991,194
RESIN IMPREGNATING METHOD
Filed Feb. 18, 1959
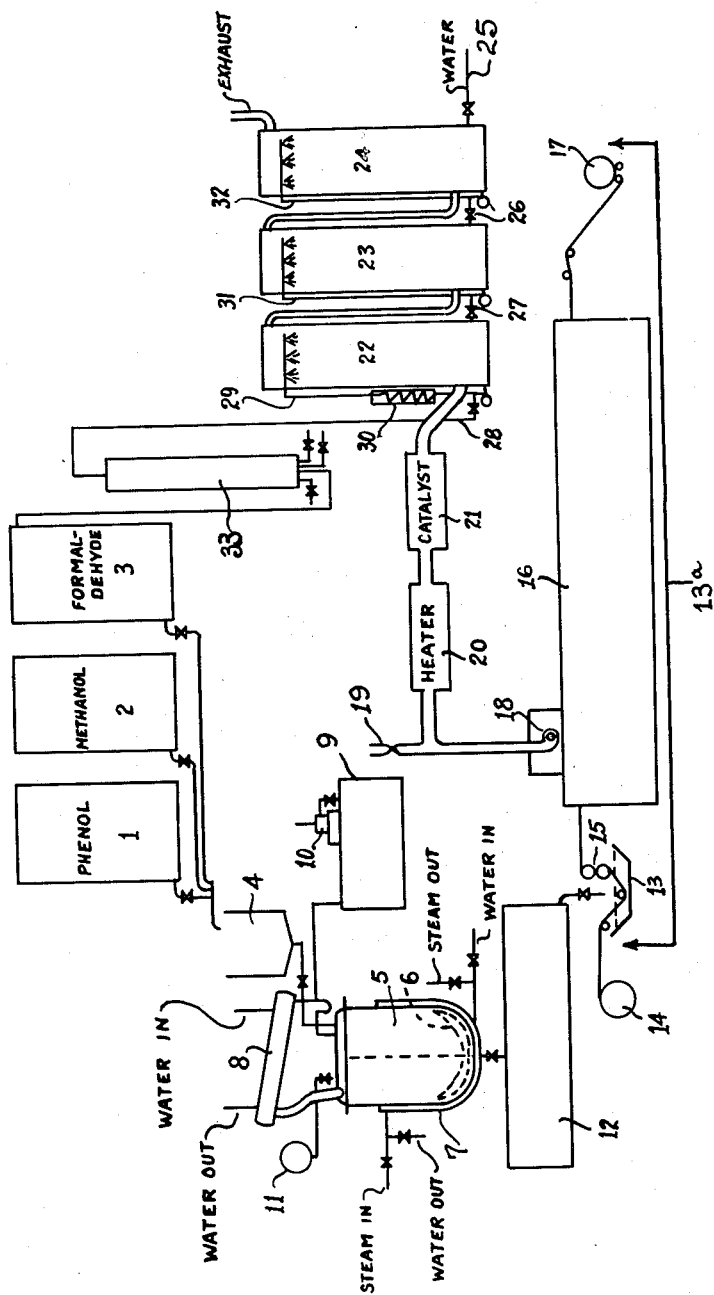
INVENTOR
E.A. CAMBRON
By Fetherstonhaugh & Co.
Attorneys

United States Patent Office 2,991,194
Patented July 4, 1961

2,991,194
RESIN IMPREGNATING METHOD
Emile A. Cambron, Cornwall, Ontario, Canada, assignor to Howard Smith Paper Mills Limited, Montreal, Quebec, Canada
Filed Feb. 18, 1959, Ser. No. 794,127
Claims priority, application Canada Dec. 6, 1958
5 Claims. (Cl. 117—102)

This invention relates to the manufacture of resin-impregnated laminating paper by a cyclic process in which the paper is impregnated with an alcohol diluted resin, such as phenol formaldehyde resin containing methyl alcohol, and in which provision is made for the efficient and economical recovery and reuse of the alcohol solvent.

The primary object of this invention is to recover the methyl alcohol used as solvent in laminating varnishes by first converting the evaporated alcohol which is contained in the exhaust gas from the impregnating machine dryer to formaldehyde and then removing the formaldehyde from the gas.

Another object of this invention is to recover the excess formaldehyde given off from the laminating varnishes in the drying zones of the impregnator.

A further object of this invention is to convert the formaldehyde thus recovered into useful laminating varnishes which can be reused.

A still further object of this invention is to greatly minimize the pollution of air surrounding laminating plants.

In the process of impregnating paper, cloth or other materials such as asbestos and glass fabrics with resins, it is necessary that the resin used be diluted with solvents. These solvents are generally members of the alcohol family.

Alcohol is also used with water in so-called water soluble resins to improve the strength of the wetted paper, to increase the drying rate on the impregnator and to reduce the loss of low molecular weight hydroxy benzyl alcohols.

These organic solvents add considerably to the cost of the resin and a process for the effective recovery of these solvents has been a major concern of the laminating industry.

Normally alcohols are recovered from air or other gases by passing the cooled gas through a bed of activated charcoal on which the alcohol is adsorbed.

The alcohol is then desorbed with steam and the carbon is next dried and reactivated. The steam and alcohol are condensed and fractionation is required to concentrate before reuse.

Because of the difficulties and expense involved in recovering alcohol by the foregoing and other known methods of recovery, the alcohol vapors originating from the laminating varnish resins are normally exhausted to the atmosphere in the impregnator dryer exhaust gas without recovery.

In the cyclic process constituting the present invention the paper is impregnated with a methyl alcohol varnish of a formaldehyde type synthetic resin, such as a phenol-formaldehyde resin and the evaporated alcohol which is contained in the exhaust gas from the dryer of the impregnating apparatus is converted to formaldehyde, which is easily and effectively removed in a battery of water scrubbers due to the very low pressure of formaldehyde in aqueous solution. The formaldehyde so produced is then reacted with phenol and/or other materials to produce the resin in fresh impregnating varnish.

The invention will now be described in detail with reference to the accompanying drawing in which the single figure is a flow sheet illustrating a preferred arrangement of apparatus employed in the practice of the invention.

In the practice of this invention, phenol and formaldehyde are drawn from the storage tanks 1 and 3 to the weighing tank 4 and transferred to the kettle 5. The kettle is equipped with an agitator 6, a steam jacket 7 (also used for cooling water) a condenser 8, a receiver 9 and a vacuum pump 10.

An appropriate catalyst is measured and added from storage tank 11. Receiver 9 and vacuum pump 10 are used for low temperature removal of part or all of the water introduced with the formaldehyde.

Methanol is then added from storage tank 2, through the weighing tank 4, to the kettle 5, to yield a varnish of suitable viscosity and solids content.

Upon completion, the resin is transferred to a storage tank 12 from which it is drawn when needed and transferred to the dip pan 13 of the impregnator 13a.

Paper is unwound from roll 14 and dipped in the resin bath in dip pan 13. Excess resin is removed by "nip" rolls 15 and the paper is then pulled through the hot drying chamber 16 and rewound at the dry end 17 of the impregnator.

Hot air is circulated from the dry end of the impregnator apparatus through drying chamber 16 toward the exhaust fan 18 and removes the solvent from the resin on the paper. In ordinary practice these evaporated solvents which are removed from drying chamber 16 are released to the atmosphere through exhaust fan 18 and discharge outlet 19.

In accordance with the present invention the methanol containing hot air, instead of being released to atmosphere, is passed through a heater 20 and thence through a catalyst chamber 21 containing a suitable catalyst in the presence of which methyl is converted to formaldehyde. The exhaust vapors are passed over the catalyst at a suitable elevated temperature. In the case where ferric oxide molybdenum oxide mixture is used as the catalyst temperatures of from 320° C. to 330° C. have been found satisfactory in practice.

The gas is then led from catalyst chamber 21 to scrubbers 22, 23 and 24 in series, in which the formaldehyde is extracted by dissolving in water, the solutions in each tower being recycled through pipes 29, 31 and 32 respectively. Fresh water is added through pipe 25 to tower 24 and the resultant dilute formaldehyde solution formed therein is transferred through pipe 26 to tower 23. The fortified solution formed therein is next transferred through pipe 27 to tower 22. The recycled solution in tower 22, passing through pipe 29, is cooled in heat exchanger 30 thus removing the heat entering the system from catalyst chamber 21 in the hot gas.

The concentrated formaldehyde is finally removed through pipe 28 from scrubbing tower 22 and directed through an ion exchange resin bed 33 to the storage tank 3. Formic acid collected in ion-exchange column 33 is removed from the column by periodically eluting with sodium carbonate by known means not shown.

The formaldehyde is then used in the preparation of varnishes by reacting with phenol. Using fresh methanol as the solvent completes the cycle.

When the formaldehyde concentration in air is about 1% on leaving catalyst chamber 21, it has been found in practice that the formaldehyde solution concentrations in towers 22, 23 and 24 respectively can be conveniently held at 37%, 10.5% and 2.9% respectively. The partial pressure of formaldehyde vapor over its aqueous solution is 0.15 mm. of mercury at the 2.9% aqueous concentration held in column 24. Since in the above case the entry formaldehyde partial pressure was 7.6 mm. the loss is approximately 2% from the system. This very high efficiency can be further increased by adding a further stage if desired.

What I claim is:

1. In the manufacture of resin impregnated laminating sheet material, the cyclic process which comprises impregnating the sheet material with a phenol formaldehyde resin varnish containing methyl alcohol as a solvent, passing the impregnated sheet material through a drying zone through which hot air is passed to remove methyl alcohol, water and formaldehyde from the impregnated sheet material, conducting exhaust vapors from the drying zone and passing them, at elevated temperature, over a suitable catalyst by means of which the methyl alcohol reacts with oxygen in the exhaust vapors and is converted to formaldehyde, absorbing in water the formaldehyde evaporated from the impregnated sheet material and the formaldehyde resulting from the aforesaid conversion of the methyl alcohol, and reusing the formaldehyde thus produced and recovered for the preparation of fresh phenol formaldehyde resin, and adding fresh methyl alcohol to produce varnish for use in the impregnating operation.

2. The process of claim 1 in which the elevated temperature referred to range from approximately 320° C. to approximately 330° C.

3. The process of claim 1 in which the catalyst is a ferric oxide molybdenum oxide mixture.

4. The process of claim 1 in which the catalyst is a ferric oxide molybdenum oxide mixture and in which the said exhaust vapors are passed over the catalyst at an elevated temperature ranging from approximately 320° C. to approximately 330° C.

5. In the manufacture of resin impregnated laminating sheet material, the cyclic process which comprises impregnating the sheet material with a phenol formaldehyde resin varnish containing methyl alcohol as a solvent, passing the impregnated sheet material through a drying zone through which hot air is passed to remove methyl alcohol, water and formaldehyde from the impregnated sheet material, conducting exhaust vapors from the drying zone and passing them, at elevated temperature, over a suitable catalyst by means of which the methyl alcohol reacts with oxygen in the exhaust vapors and is converted to formaldehyde, adsorbing in water the formaldehyde evaporated from the impregnated sheet material and the formaldehyde resulting from the aforesaid conversion of the methyl alcohol, passing the formaldehyde from the adsorbing zone in which the formaldehyde is adsorbed in water through an ion-exchange resin bed to a formaldehyde storage zone from which the recovered formaldehyde is withdrawn and used in the preparation of fresh phenol formaldehyde resin and adding methyl alcohol to the resin to produce varnish for use in the impregnating operation.

References Cited in the file of this patent

UNITED STATES PATENTS

| | | |
|---|---|---|
| 1,913,405 | Meharg et al. | June 13, 1933 |

FOREIGN PATENTS

| | | |
|---|---|---|
| 479,257 | Great Britain | Feb. 2, 1938 |

OTHER REFERENCES

Walker, J. F.: "Formaldehyde," Rheinhold Publishing Corp., New York (1953). Copy in Division 38.